United States Patent

[11] 3,583,712

[72] Inventors Dietrich Domros
Weinheim;
Wilhelm Schmitt, Erbach, both of, Germany
[21] Appl. No. 885,728
[22] Filed Dec. 17, 1969
[45] Patented June 8, 1971
[73] Assignee Carl Freudenberg K.G.
Weinheim, Germany
[32] Priority Dec. 17, 1968
[33] Germany
[31] G6811760

[54] COMPRESSION RING
11 Claims, 2 Drawing Figs.
[52] U.S. Cl. .................................................. 277/214
[51] Int. Cl. ................................................... F16k 41/04
[50] Field of Search ...................................... 277/214, 210, 208, 229, 230

[56] References Cited
UNITED STATES PATENTS
| | | | |
|---|---|---|---|
| 1,455,682 | 5/1923 | Trumbull .................... | 277/214 |
| 1,686,090 | 10/1928 | MacClatchie ............... | 277/214X |
| 2,233,902 | 3/1941 | Schmied ..................... | 277/208X |

*Primary Examiner*—Robert I. Smith
*Assistant Examiner*—Robert I. Smith
*Attorney*—Michael S. Striker ABSTRACT: A sealing construction in which a sealing ring is carried by a piston spacedly surrounded by a cylinder. The sealing ring comprises portions extending outwardly from its outer peripheral surface into sealing engagement with the inner peripheral surface of the cylinder, and comprises a plurality of layers of a textile material adjacent the portions engaging the inner peripheral surface of the cylinder and out of engagement with the latter. The layers of textile material serve to increase the abrasion resistance and a better lubrication adhesion.

Inventor:
DIETRICH DOMROS
WILHELM SCHMITT 3,583,712

COMPRESSION RING

BACKGROUND OF THE INVENTION

The present invention relates to a compression ring having a substantially rectangular cross section.

Hitherto, such sealing rings have been manufactured from a textile material and, at their outer side or that side which faces the relatively movable part, are provided with a spherical elevation.

SUMMARY OF THE INVENTION

Object of the present invention is to provide a compression ring which, primarily, is made from a rubber material has sealing edges, and by incorporating textile material has the advantages inherent in such material, with the most important advantage being an increased abrasion resistance and a better lubrication adhesion.

Such a compression ring according to the present invention comprises in combination a piston having an outer peripheral surface and a cylinder having an inner peripheral surface spacedly surrounding the outer peripheral surface of the piston. A sealing ring is mounted on and carried by the piston and includes portions which extend into sealing engagement with the inner surface of the cylinder. At least one layer of a textile material is superimposed on the sealing ring adjacent the portions sealingly engaging the inner surface of the cylinder and serving to increase the abrasion resistance and lubrication adhesion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
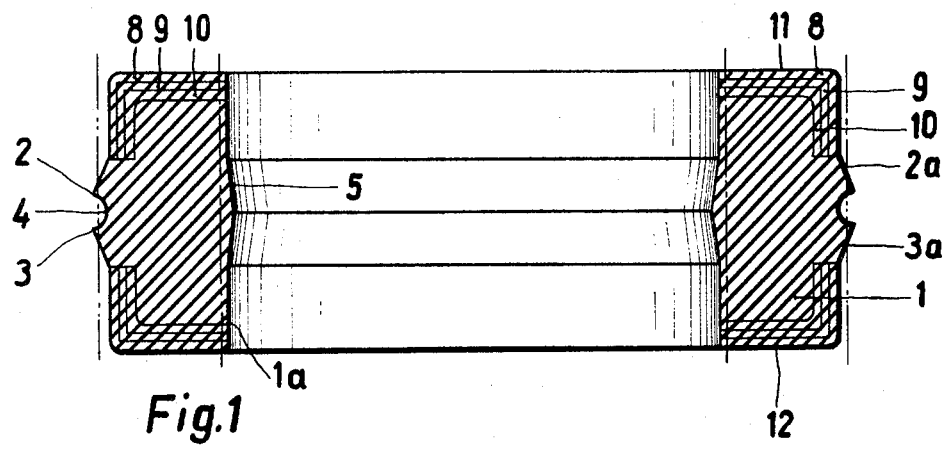
FIG. 1 shows a compression ring embodied according to the present invention.
Figure 2:
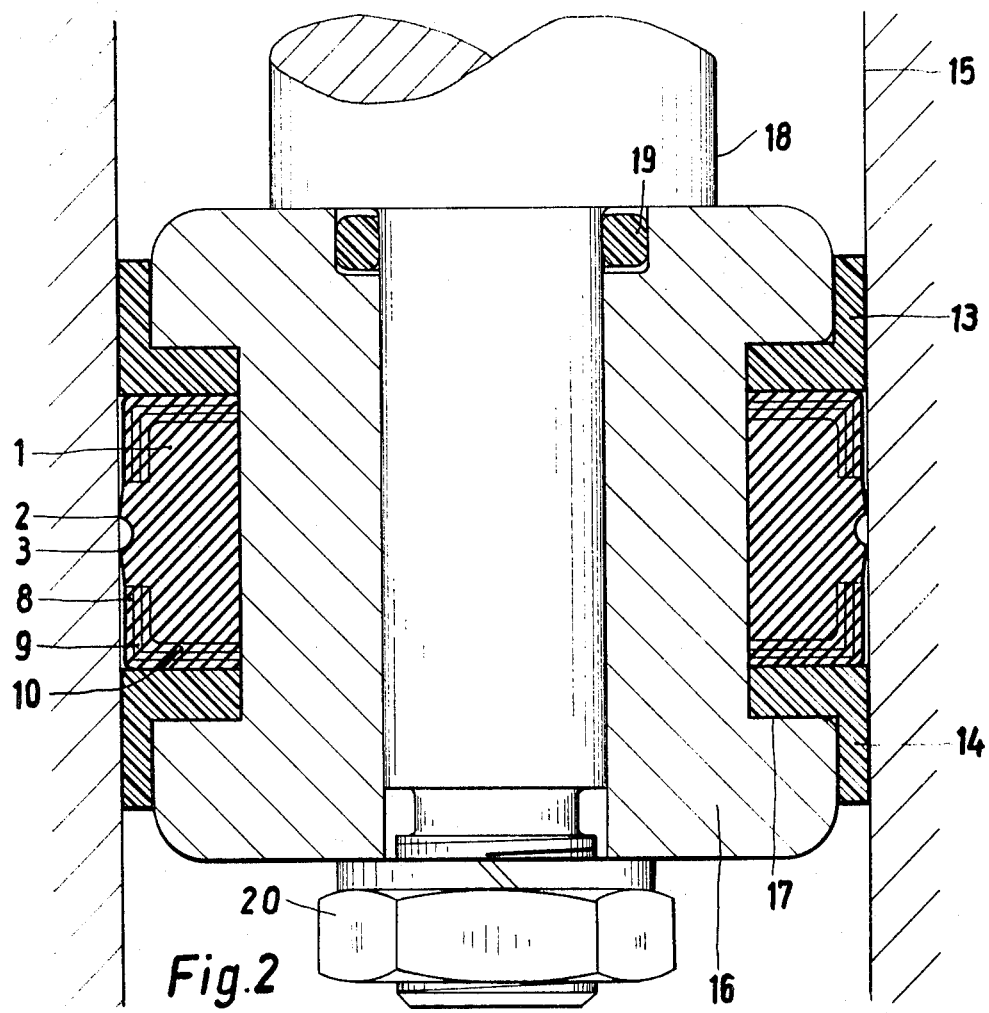
FIG. 2 shows the compression ring of FIG. 1 accommodated and supported in a piston.

Referring now to the drawings in which like reference numerals index like parts, and with reference initially directed to FIG. 1, the annular rubber compression ring 1 for use with a piston, essentially comprises a rectangular cross section and is provided with two sealing lips 2, 3 along its outer circumferential surface which constitutes the bearing or sliding surface of the compression ring and which faces the inner cylindrical surface of the cylinder in which the piston, such as shown in FIG. 2, is slidably accommodated.

The sealing lips 2, 3 are spaced apart from each other by means of a circumferential groove 4 which has a substantially semicircular cross section.

The lips 2, 3, adjacent the groove 4, are seen to respectively constitute upwardly and downwardly extending slanting surfaces 2a and 3a which are arranged such that the outer profile of the compression ring would seem to be constituted by the oppositely oriented exterior sealing lips of a grooved-ring collar.

The inner periphery of the annular opening 1a of the compression ring 1 is seen to comprise a triangular cross section 5 which serves to increase the bearing contact between the sealing lips 2, 3 and the inner cylindrical surface of a cylinder, such as shown in FIG. 2.

Three annular textile layers 8, 9 and 10 are superimposed on and adhered to the disc-shaped outer periphery of the sealing ring 1, i.e., those peripheral portions of the ring which, seen in cross section of the latter, constitute the corner portions of the same and extend between the respective sealing lips 2, 3, on the one hand, and the upper and lower ends of the opening 1a, on the other hand.

The annular layers 8, 9 and 10, in cross section, and at their axially opposite ends, constitute right angular corner portions which, upon binding the layers to the ring 1, constitute the right angular cross sections with the same.

The layers are out of engagement with the cylinder surface and consist, for example, of fibers or textures and, preferably, are not superimposed on or cover the sealing lips 2, 3 for reasons that sealing surfaces solely made from rubber, effect a better sealing action. However, if necessary, marginal portions of the layers may, at most partially, extend along the slanting surfaces 2a, 3a.

In the above manner of superimposing and binding the layers on the ring 1, the major axial portions of the layers overlap the axial end faces 11, 12 of the ring 1 and extend parallel therewith.

FIG. 2 shows the sealing ring 1 of FIG. 1 accommodated and supported in a groove 17 of a piston 16. A support ring 13 and 14 respectively supports the sealing ring 1 at its opposite end faces in the groove 17 and both support rings are made of a relatively inflexible material such as, for example, a duroplastic or thermoplastic material.

The piston is reciprocably mounted in a cylinder 15.

A piston rod 18 mounts the piston 16 in the cylinder and an O-ring 19 is provided between the inner piston surface and the outer piston rod surface.

The compression ring 1 according to the invention and as described above has the advantage that as a result of its large elasticity as compared with full-weaved type compression rings, can be strongly expanded.

The compression ring 1, in stretched condition, can be easily snapped into the groove 17 and as conventional, serves to seal off fluid and gaseous media.

The width of the textile layers, preferably, is about 20—25 percent of the radial dimension of the sealing ring.

To modify the above sealing construction, those sections of the textile layers which, as shown in FIG. 2, are interposed between the respective abutting surfaces of the support rings 13, 14 and the axial end faces 11 and 12, may be omitted.

The textile layers may be made from natural, semisynthetic, or synthetic fibers.

It will be understood from the above that by providing the sealing ring 1 with at least one of the textile layers 8, 9 or 10, the abrasion resistance is increased while the layer or layers, as such, are capable of storing a relatively large quantity of lubrication and, thus, improves the lubrication of the respective surfaces of the sealing member and the cylinder.

It will be understood that each of the elements described above, or two or more together, may also find a useful application in other types of compression rings differing from the types described above.

While the invention has been illustrated and described as embodied in FIGS. 1 and 2, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A sealing construction, comprising in combination, a first member having an outer peripheral surface and a second member having an inner peripheral surface spacedly surrounding said outer peripheral surface, one of said members being reciprocable relative to the other of said members; and a sealing ring carried by one of said surfaces and having portions extending into sealing engagement with the other of said surfaces; and at least one layer of a textile material on said sealing ring adjacent said portions and normally out of engagement with the other of said surfaces.

2. A construction as defined in claim 1, wherein said first member is a piston and said second member is a cylinder with the former reciprocable relative to the latter, and wherein said sealing ring is carried by said outer peripheral surface of said piston and with said portions of said sealing ring extending into sealing engagement with said inner peripheral surface of said cylinder.

3. A construction as defined in claim 2, wherein said portions of said sealing ring constitutes a peripheral projection on said outer peripheral surface of said piston, and wherein said at least one layer of textile material constitutes said outer peripheral surface of said sealing ring adjacent said peripheral projection and adjoining the latter.

4. A construction as defined in claim 3, wherein said peripheral projection constitutes a first and second sealing lip spaced relative to each other by a peripheral groove, and wherein said at least one layer of textile material constitutes said outer peripheral surface of said sealing ring adjacent said first and second sealing lips.

5. A construction as defined in claim 4, wherein said sealing ring has opposite axial end faces bounding said outer peripheral surfaces, and wherein said at least one textile layer constitutes said outer peripheral surface adjacent said first and second sealing lips and extends along and parallel with said opposite axial end faces of said sealing ring.

6. A construction as defined in claim 5, wherein said sealing ring is annular and wherein said at least one layer of textile material constitutes 20 percent of the radial width of said sealing ring.

7. A construction as defined in claim 5, wherein said sealing ring is annular and wherein said at least one layer of textile material constitutes 25 percent of the radial width of said sealing ring.

8. A construction as defined in claim 5, wherein said sealing ring is provided with three layers of textile material superimposed on each other and bonded to said sealing ring.

9. A construction as defined in claim 2, wherein said piston has an outer peripheral surface with a peripheral groove formed in said surface, and wherein said sealing ring is seated in said peripheral groove and supported therein at opposite ends by means of rigid support rings having a substantially L-shaped cross section and made from a duroplastic or thermoplastic material.

10. A construction as defined in claim 1, wherein said sealing ring is made of rubber.

11. A construction as defined in claim 1, wherein said sealing ring is substantially rectangular in cross section.